(12) United States Patent
Petschauer

(10) Patent No.: US 6,171,990 B1
(45) Date of Patent: Jan. 9, 2001

(54) LARGE-FORMAT FIRECLAY REFRACTORY BRICK, IN PARTICULAR BOTTOM BLOCK FOR A TIN BATH

(75) Inventor: Hans Petschauer, Grossalmerode (DE)

(73) Assignee: VGT Industriekeramik GmbH, Grossalmerode (DE)

(*) Notice: Under 35 U.S.C. 154(b), the term of this patent shall be extended for 0 days.

(21) Appl. No.: 09/163,525

(22) Filed: Sep. 30, 1998

Related U.S. Application Data

(63) Continuation-in-part of application No. 08/742,669, filed on Nov. 4, 1996, now abandoned.

(30) Foreign Application Priority Data

Nov. 16, 1995 (DE) .................................. 195 42 700

(51) Int. Cl.[7] .................................................. C04B 35/03
(52) U.S. Cl. .......................... 501/128; 501/80; 501/81; 501/82; 501/130; 428/702
(58) Field of Search ........................... 501/80, 84, 128, 501/130, 81, 82; 428/702

(56) References Cited

U.S. PATENT DOCUMENTS

| | | | |
|---|---|---|---|
| 4,575,439 | * 3/1986 | Hintzen et al. | 501/84 |
| 4,687,752 | * 8/1987 | Peters | 501/155 |
| 4,833,109 | * 5/1989 | Macey et al. | 501/80 |
| 5,252,526 | * 10/1993 | Whittemore | 501/128 |
| 5,407,875 | * 4/1995 | Petschauer | 501/127 |

* cited by examiner

*Primary Examiner*—Karl Group
(74) *Attorney, Agent, or Firm*—Thomas, Kayden, Horstemeyer & Risley

(57) ABSTRACT

A large-format fireclay refractory brick for use as bottom block in a tin bath and a method for its manufacture, said brick formed of material of the $Al_2O_3$—$SiO_2$ system filling material and opening material. The preferred embodiment of the brick has an upper and a lower layer with the filling and/or opening material contained only in the lower layer. The brick has an open porosity of 20 to 25 percent by volume, a gas permeability of less than 3 nPm and an $H_2$-diffusion of less than 150 mm $H_2O$, resulting in a brick with improved resistance to alkali attack and decreased caloric conductivity.

5 Claims, 1 Drawing Sheet

LARGE-FORMAT FIRECLAY REFRACTORY BRICK, IN PARTICULAR BOTTOM BLOCK FOR A TIN BATH

RELATED APPLICATIONS

This application is a Continuation-In-Part application based on and claiming benefit of a U.S. Utility application, Ser. No. 08/742,669, filed on Nov. 4, 1996, now abandoned.

INCORPORATION BY REFERENCE

U.S. Pat. No. 5,407,875, issued on Apr. 18, 1995, and U.S. Utility application, Ser. No. 08/742,669, filed on Nov. 4, 1996 are herein incorporated by reference.

FIELD OF THE INVENTION

The invention relates to a large-format fireclay refractory brick, in particular bottom block for a tin bath, consisting of brick-forming material of the system $Al_2O_3$—$SiO_2$ having a top surface for contacting a tin bath and showing an open porosity of about 20 to 25 percent by volume and a closed porosity. Furthermore, the invention is directed to a method for manufacturing large-format fireclay refractory bricks.

BACKGROUND OF THE INVENTION

Large format fireclay refractory bricks typically have a rectangular cross section and a top surface for contacting a tin bath and a bottom surface for not facing a tin bath. The bottom surface not facing the tin bath is supported by a steel construction in the form of a tub. Such large-format fireclay refractory bricks are manufactured in a known manner, and are formed of brick-forming material of the $Al_2O_3$—$SiO_2$ system, i.e. chamotte, silika, clay, etc.

The brick-forming material typically includes a mixture of chamotte with a grain size of up to 5mm; an incombustible clay which is rich in silic acid and having a quartz component of greater than 50% with respect to the clay component with the quartz having a grain size of up to 50 $\mu$m; a fine particle incombustible clay with an alkali component of up to 3%; an alkali-aluminosilicate, and; a binding agent. Additionally, one part of the chamotte can be replaced by a natural aluminosilicate, and fine particle C-glass with a particle size of less than 60 $\mu$m can be used as an alkali-aluminosilicate. The brick-forming material is processed in a known manner, whereby the material is mixed and then poured into a mould. The material in the mould is shaped, such as by pressing, stamping, etc., and then allowed to dry in an atmosphere having a humidity of between 4-7%, after which the material is subsequently fired for at least 5 hours at a temperature of between 1200–1350° C. After firing, the brick is cooled and then is typically ground with a grinder in order to finish the brick to a desired size and shape.

Such large-format fireclay refractory bricks used in a tub to be coated to receive the tin bath and consisting of a material of the $Al_2O_3$—$SiO_2$ system are known. The here interesting part of the glass producing facility has a steel construction being coated with the large-format refractory bricks. Thereby a production tub is formed being filled with liquid tin. The melted glass is poured out on the surface of the tin bath. The glass expands on the surface of the tin bath and is drawn as a thin band with a substantial width over the surface of the tin bath. This is the known way of manufacturing flat glass according to the float technique. Manufacturing flat glass temperatures of about 600° C. to 1200° C. occur above the surface of the tin bath. Manufacturing special kinds of glass even higher temperatures may occur.

Due to these higher temperatures the large-format fireclay refractory bricks at all of its different points are subject to higher temperatures. It is known to cool the tub of the steel construction containing the bricks and the tin bath from outside in order to freeze the liquid tin in the gaps between the adjacent side surfaces of the bricks and thereby prevent the passage of liquid tin to the outside.

During the manufacturing of flat glass $Na_2O$ diffuses into the liquid tin so that sodium and atomic oxygen is solved in the tin bath. An exchange of sodium happens between the tin and the material of the fireclay refractory brick. This finally may lead to chipping off of layers of the top surface of the blocks facing the tin bath. In addition, there is the danger of penetration of liquid tin in the gaps between the side surfaces of adjacent bricks or of a passage of liquid tin through the gaps to the outside respectively. This is prevented by cooling as mentioned above. The cooling must be increased if above the tin bath higher temperatures occur than about 1000° C. Cooling the tub there is the danger that the cooling effect is not uniform at all points of the tub. This is especially the case if the cooling should fail. In both circumstances the temperature of the tin bath varies which results in a minor quality of the produced glass.

The known fireclay refractory bricks have an open porosity, i.e. a percent by volume of the open pores extending to the outside surface of the brick, which generally is in the amount of 20 to 25 percent by volume. These known blocks have a closed porosity also, i.e. a percent by volume of closed pores in the interior of the block. The percentage of the open porosity and the closed porosity are similar with respect to the known bricks.

SUMMARY OF THE INVENTION

It is the object of the invention to provide a large-format fireclay refractory brick adapted to coat a tin bath and having a sufficient resistance to alkali attack and thereby substantially maintaining the air permeability, the $H_2$ diffusion, the elasticity, and the mechanical properties on the one hand and giving the possibility however to use higher temperatures above the surface of the tin bath and to reduce the danger of the passage of liquid tin to the outside on the other hand.

According to the invention, this object is realized with a large-format fireclay refractory brick of the type described above, wherein the material of the brick comprises such an amount of a lightweight filling material and/or such an amount of an opening material is added during the manufacture of the block so that the closed porosity is increased by about 10 to 15 percent by volume, while the open porosity is basically maintained in an unchanged condition.

BRIEF DESCRIPTION OF THE DRAWING

The accompanying drawing incorporated in and forming a part of the specification illustrate several aspects of the present inventions, and together with the description serve to explain the principles of the inventions. The components in the drawing are not necessarily to scale, emphasis instead being placed upon clearly illustrating principles of the present inventions.

DETAILED DESCRIPTION OF THE INVENTION

Figure 1:
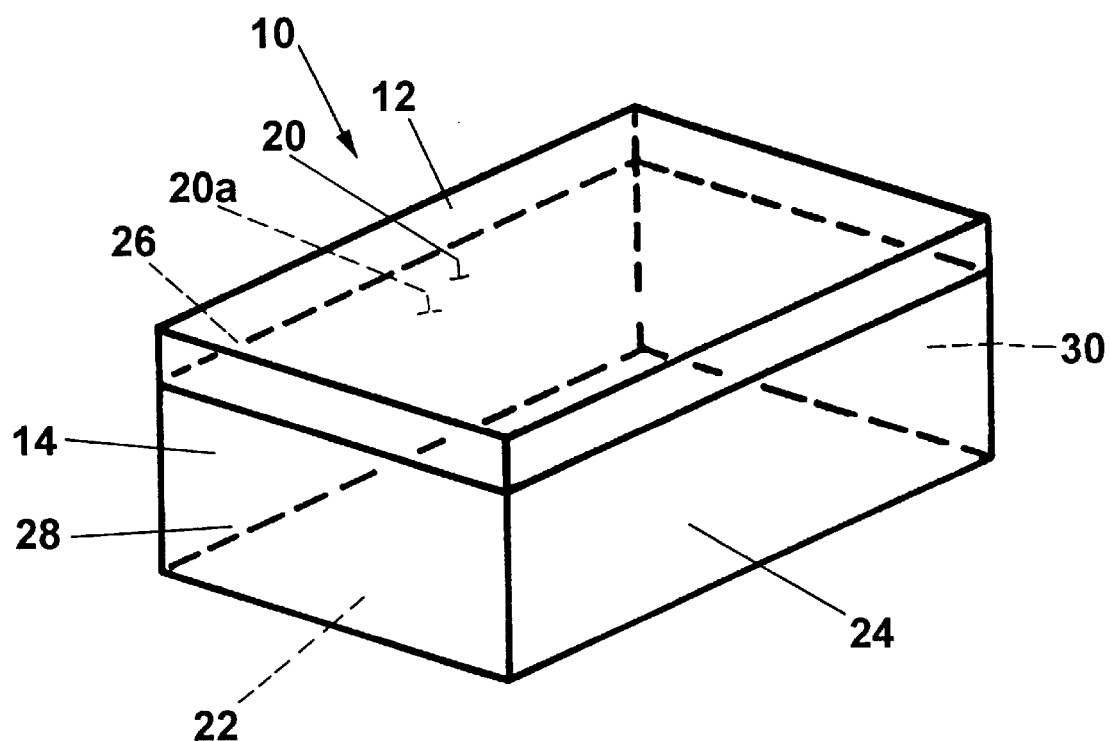
FIG. 1 is a perspective view of the preferred embodiment of the present invention.

The invention is based on the idea to maintain the material of the known fireclay refractory brick including the essential mechanical properties and the resistance to alkali attack. Particularly the air permeability should be lower than 3 nPm. The modulus of elasticity of 3.000 to 10.000 N/m$^2$ should be maintained. Also the open porosity in amount of about 20 to 25 percent by volume should be maintained. The H$_2$ diffusion should be kept below about 150 mm H$_2$O. The chemical and the mineral composition should be maintained in an unchanged manner.

The variation in the material is directed only to the fact to increase the closed porosity. Thus, the open porosity must be maintained in general also. The distribution of the pore sizes is not changed also. The caloric conductibility of the fireclay refractory brick should be decreased in order to achieve a better insulating property and to prevent thickening of the bricks. A brick-forming material of the Al$_2$O$_3$—SiO$_2$ system is used, i. e. a material having a high caloric conductibility.

In order to achieve these results, an amount of a lightweight filling material and/or opening material is added to the brick-forming material to reduce the high caloric conductibility, whereby the variation shows an influence only as far as the closed porosity is concerned, but not the open porosity. The brick-forming material can contain up to 15 percent by weight of a lightweight filling material, such as light weight fireclay aggregate, light weight fly ash, bubble aluminum oxide, bubble alundum, etc., or up to 15 percent by weight of an opening material, such as saw dust, cork, styropor, walnut shell flour, briquette dust, etc., prior to firing. Additionally, a combination of several lightweight filling materials and/or opening materials can be used simultaneously with the total amount of filling and/or opening material included being up to 15 percent by weight.

While the amount of filling material and/or opening material used is up to 15 percent by weight, amounts of 8 to 12 percent by weight is preferred. The brick-forming material also can contain an organic foaming agent, such as ionoge tenside, saponime, some protein products, etc., in addition to the lightweight filling material and/or the opening material.

So formed, the raw unit weight of the block is decreased, i. e. from about 2, 1 to an amount of about 1, 7 to 1, 8 g/cm. The cold crushing strength is reduced from about 40 to a region between 25 and 30 N/mm$^2$. Advantageously the novel fireclay refractory brick has a caloric conductibility which is reduced by about 25 percent so that a better insulating property results maintaining the mechanical properties. The total weight of the brick having the same outer dimensions is decreased by about 15 percent so that those brick may be handled easier.

Especially it is possible that the fireclay refractory brick is formed containing two layers, but the brick contains or has contained respectively the lightweight filling material and/or the opening material only in the layer not facing the tin bath. This takes aim at the preparation of a first top surface contacting the tin bath which is formed comparatively dense, while the second bottom surface facing the steel construction has better isolating properties. This protection layer thereby generated can have a thickness being smaller than the thickness of the generated isolating layer.

As shown in FIG. 1, the preferred embodiment of the brick 10 incorporates two layers, an upper protective layer 12 and a lower insulating layer 14, with lightweight filling material and/or opening material being only in the lower layer 14. This is accomplished by mixing a first material incorporating lightweight filling material and/or opening material and forming the first material into a lower layer 14. A second material is then mixed and formed on top of the lower layer 14 to form an upper layer 12. The layers 12 and 14 are then shaped, dried, fired, cooled and finished in a conventional manner to form the brick 10.

Since the brick 10 only contains the lightweight filling material and/or opening material in the lower layer 14, the lower layer is formed as a more porous structure than the upper layer 12, with the entire brick 10 having an increased closed porosity, as compared to a prior art brick, while the open porosity remains substantially constant. When only filling material has been added to the lower layer 14, this result should be apparent. However, this result is also achieved by adding only opening material or a combination of opening material and filling material to the lower layer 14.

Open porosity is determined by calculating the number of pores (not shown) which extend to the exterior surfaces of the brick. This includes pores which extend to the upper face 20, lower face 22, opposed side faces, 24 and 26 respectively, and opposed end faces, 28 and 30 respectively. However, since the preferred embodiment of the brick 10 (FIG. 1) incorporates layers, the calculation of open porosity does not include the number of pores extending to the upper face 20a of the lower layer 14 which contains more open pores than contained in the upper face 20 (part of the upper layer 12). As a result, when an amount of opening material is added to the lower layer 14, open porosity remains substantially constant, while the closed porosity of the entire brick 10 is substantially increased relative to the open porosity.

In the two-layer configuration, the brick 10 is typically incorporated into a tin bath with the lower layer 14 is arranged so that it does not face the molten tin of a tin bath (not shown). This allows the comparatively dense upper layer 12 to contact the molten tin. while the lower layer 14 contacts framing members (not shown), e.g. steel members, which support the tub of the tin bath. The protective upper layer 12 also can be thinner than the lower layer 14 while achieving the desired mechanical characteristics of the brick 10.

The lightweight filling material and/or the opening material utilized in the manufacture of the bricks of the present invention should preferably be incorporated into the brick-forming material 16 in a fine grain sized form. This results in a brick having small, evenly distributed pores 20 which have been shown to have a positive effect on gas permeability and H$_2$ diffusion. It has been determined that a grain size smaller than 500 μm produces a brick 10 having the desired pore size characteristics.

By manufacturing the brick 10 as described hereinabove, closed porosity of the brick 10 is increased by about 10 to 15 percent by volume as compared to the prior art while open porosity remains substantially unchanged.

A method for manufacturing the fireclay refractory brick in accordance with the present invention is characterized by the fact that lightweight filling material and/or opening material is added to the brick-forming material in such an amount so that the closed porosity is increased by about 10 to 15 percent by volume, while the open porosity is basically maintained in an unchanged condition. Thus, it should be noted that only the closed porosity is increased, but not the open porosity.

This happens by adding lightweight filling material, i.e. material which is present even after firing. But opening material may be added also during the manufacturing process which disappears during firing and finally leaves holes filled with air in the shape of pores in the fireclay refractory brick.

In the following chart, several embodiments of the invention are described with respect to the prior art. In the first column (prior art), an example of a brick produced in accordance with the method of U.S. Pat. No. 5,407,875 is shown. The following four columns, I to IV, show the parameters of embodiments of large-format fireclay refractory bricks produced in accordance with the present invention.

|  |  | Prior Art | I | II | III | IV |
| --- | --- | --- | --- | --- | --- | --- |
| raw unit weight. | g/cm$^3$ | 2,12 | 1,76 | 1,80 | 1,79 | 1,77 |
| open porosity | Vol. % | 22,1 | 22,20 | 21,09 | 21,52 | 22,31 |
| total porosity | Vol. % | 22,7 | 34,80 | 34,06 | 34,43 | 35,16 |
| cold crush strength | N/mm$^2$ | 47 | 26,4 | 33,0 | 32,2 | 28,9 |
| gas permeability | nPm | 2,05 | 1,22 | 0,86 | 1,01 | 1,24 |
| relative density | g/cm$^3$ | 2,74 | 2,72 | 2,73 | 2,73 | 2,73 |
| filling material | wt. % | 0 |  |  |  |  |
| opening material | wt. % | 0 |  |  |  |  |
| layers | no. | 1 |  |  |  |  |

As shown, the addition of filling material and/or opening material increases the total porosity of the brick, by increasing the closed porosity, while maintaining the open porosity at a substantially constant value.

As shown in the following chart, the addition of filling material and/or opening material in accordance with the present invention decreases the caloric conductibility of the brick.

|  | Prior Art | I |
| --- | --- | --- |
| 300° C. | 1,443 W/m°K | 1,089 W/m°K |
| 600° C. | 1,545 W/m°K | 1,198 W/m°K |
| 900° C. | 1,644 W/m°K | 1,207 W/m°K |

The caloric conductibility is reduced by about 25%, i.e. the fireclay refractory brick has an increased insulating property.

Chemical analysis of embodiment I has revealed the following parts in weight percentage: $SiO_2$ (56.42%); $Al_2O_3$ (38.47%); $TiO_2$ (1.58%); $Fe_2O_3$ (0.83%); $Na_2O$ (0.86%); $K_2O$ (0.70%); CaO (0.52%), and; MgO (0.11%).

The foregoing description has been presented for purposes of illustration and description. It is not intended to be exhaustive or to limit the invention to the precise forms disclosed. Obvious modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A large-format fireclay refractory brick configured to form a bottom block for a tin bath, said brick being manufactured from brick-forming material which comprises chamotte having a grain size of up to 5 mm, an incombustible clay having a quartz component greater than 50% by weight and a maximum quartz component particle size of 50 μm, a fine panicle incombustible clay having a total alkali component of up to 3%, an alkali-aluminosilicate, and a binding agent, said brick having an open porosity of 20 to 25 percent by volume, wherein the improvement comprises:

said brick having a first layer configured for facing a tin bath and a second layer configured for facing away from a tin bath, said second layer having a closed porosity of 10 to 15 percent by volume, a gas permeability of less than 3 nPrm, and an $H_2$-diffusion of less than 150 mm $H_2O$ after manufacture, and wherein said second layer has a higher open porosity and a lower caloric conductivity than said first layer.

2. A large-format fireclay refractory brick configured to form a bottom block for a tin bath, said brick being manufactured from brick-forming material which comprises $Al_2O_3$ and $SiO_2$ said brick having an open porosity of 20 to 25 percent by volume, wherein the improvement comprises:

said brick having a first layer configured for facing a tin bath and a second layer configured for facing away from a tin bath and said second layer having been formed with filling material and opening material while manufacturing said brick such that said second layer has a closed porosity of 10 to 15 percent by volume, a gas permeability of less than 3 nPm, and an $H_2$-diffusion of less than 150 mm $H_2O$ after manufacture wherein said second layer has a higher open porosity and lower caloric conductivity than said first layer.

3. The brick of claim 2, wherein said brick-forming material of said layer contains up to 15 percent by weight of said filling material and said opening material.

4. The brick of claim 2, wherein said brick has a first and a second layer, said first layer configured to face a tin bath, said second layer incorporating said filling material and opening material and configured to face away from a tin bath such that said second layer has a higher open porosity and a lower caloric conductivity than said first layer.

5. The brick of claim 2, wherein said filling material and said opening material each have a grain size smaller than 500 μm.

* * * * *